United States Patent [19]
Kojima

[11] Patent Number: 6,011,601
[45] Date of Patent: Jan. 4, 2000

[54] BACKLIGHT SYSTEM FOR LIQUID CRYSTAL DISPLAY COMPRISING PRISM LENS HAVING APEX ANGLE OF 80°-85° AND REFRACTIVE INDEX OF 1.57-1.59

[75] Inventor: Hiroshi Kojima, Tokyo-To, Japan

[73] Assignee: Dai Nippon Printing Co., Ltd., Japan

[21] Appl. No.: 08/896,832

[22] Filed: Jul. 18, 1997

[30] Foreign Application Priority Data

Jul. 23, 1996 [JP] Japan ..................... 8-193369

[51] Int. Cl.⁷ .................................. G02F 1/1335
[52] U.S. Cl. .................. 349/62; 349/64; 349/65; 349/67; 349/95; 349/112; 349/113
[58] Field of Search ................ 349/65, 64, 67, 349/62, 112, 113, 95

[56] References Cited

U.S. PATENT DOCUMENTS

| | | | |
|---|---|---|---|
| 5,467,208 | 11/1995 | Kkawa et al. | 359/49 |
| 5,521,797 | 5/1996 | Kashima et al. | 362/31 |
| 5,557,433 | 9/1996 | Maruyama et al. | 359/41 |
| 5,592,332 | 1/1997 | Nishio et al. | 359/619 |
| 5,596,429 | 1/1997 | Kokawa et al. | 349/67 |
| 5,719,649 | 2/1998 | Shono et al. | 349/65 |
| 5,808,784 | 9/1998 | Ando et al. | 359/443 |
| 5,841,572 | 11/1998 | Ando et al. | 359/456 |

*Primary Examiner*—William L. Sikes
*Assistant Examiner*—Julie Ngo
*Attorney, Agent, or Firm*—Parkhurst & Wendel, L.L.P

[57] ABSTRACT

A liquid crystal display comprises a liquid crystal display device (30), a backlight system (20) provided with a prism lens sheet (10). The lens sheet comprises a transparent base sheet (11), and a lens sheet formed integrally with the base sheet and provided with a plurality of parallel unit lenses (12). Each of the unit lenses (12) has a cross section of a shape of an isosceles triangle having an apex angle ($\alpha$) in the range of 80° to 87°, and is made of a radiation setting resin having a refractive index in the range of 1.57 to 1.59. The prism lens sheet has a half-brightness viewing angle of 65° or below, and the difference between the half-brightness viewing angle and a brightness-curve inversion angle is 20° or above to prevent information displayed on the screen of the liquid crystal display from being seen sidewise by others.

6 Claims, 10 Drawing Sheets

| EXAMPLE | APEX ANGLE | REFRACTIVE INDEX | FIELD OF VIEW | BRIGHTNESS | REMARKS |
|---|---|---|---|---|---|
| 1 | 80 | 1.49 | BAD | BAD | DARK AND EASY TO SEE OBLIQUELY |
| 2 | | 1.57 | NOT GOOD | GOOD | SOMEWHAT EASY TO SEE OBLIQUELY |
| 3 | | 1.59 | GOOD | GOOD | DIFFICULT TO SEE OBLIQUELY |
| 4 | 83 | 1.49 | BAD | BAD | DARK AND EASY TO SEE OBLIQUELY |
| 5 | | 1.57 | GOOD | GOOD | DIFFICULT TO SEE OBLIQUELY |
| 6 | | 1.59 | GOOD | GOOD | DIFFICULT TO SEE OBLIQUELY |
| 7 | 85 | 1.49 | BAD | BAD | DARK AND EASY TO SEE OBLIQUELY |
| 8 | | 1.57 | GOOD | GOOD | DIFFICULT TO SEE OBLIQUELY |
| 9 | | 1.59 | GOOD | GOOD | DIFFICULT TO SEE OBLIQUELY |
| 10 | 90 | 1.49 | BAD | NOT GOOD | SOMEWHAT DARK AND EASY TO SEE OBLIQUELY |
| 11 | | 1.57 | BAD | GOOD | EASY TO SEE OBLIQUELY |
| 12 | | 1.59 | NOT GOOD | GOOD | SOMEWHAT EASY TO SEE OBLIQUELY |

FIG.10

BACKLIGHT SYSTEM FOR LIQUID CRYSTAL DISPLAY COMPRISING PRISM LENS HAVING APEX ANGLE OF 80°-85° AND REFRACTIVE INDEX OF 1.57-1.59

BACKGROUND OF THE INVENTION

1. Field of the Invention

The present invention relates to a prism lens sheet capable of optically controlling the luminance and the viewing angle of a screen, and a backlight system employing such a prism lens sheet for use in a liquid crystal display.

2. Description of the Related Art

Lightweight, high-definition liquid crystal displays have been developed and have widely been applied to office automation machines including personal computers. A liquid crystal display is provided with a backlight system to enable its screen to secure a proper luminance or brightness because liquid crystal itself does not emit light. Personal computers of a notebook type have come into wide use recently. Such personal computers provided with a liquid crystal display have become often used personally in an open space, and it is desired that the liquid crystal display has a relatively small viewing angle in view of protecting information displayed on the screen of the liquid crystal display. Therefore, it is desirable to control the brightness and the viewing angle of the screen of the liquid crystal display by an improved backlight system. Such a requirement may be met by enhancing the brightness of the backlight system to increase the directivity of light emitted from the backlight system toward the viewer. However, the increase in the brightness of the backlight system entails increase in power consumption, heat generation and costs.

SUMMARY OF THE INVENTION

Accordingly, it is an object of the present invention to provide a prism lens sheet which enables the optical control of the brightness and the viewing angle of the screen of a liquid crystal display without requiring a structural improvement of the backlight system, and to provide a backlight system employing the prism lens sheet and a liquid crystal display employing the prism lens sheet.

According to a first aspect of the present invention, a prism lens sheet comprises a transparent base sheet, and a lens sheet provided with a plurality of parallel unit lenses having the shape of a triangular prism and arranged longitudinally, and formed integrally with the base sheet. Each unit lens has a cross section of a shape resembling an isosceles triangle having an apex angle in the range of 80° to 87°.

The unit lenses of the prism lens sheet are made of a material having a refractive index in the range of 1.57 to 1.59.

The viewing angle at a half brightness of the prism lens sheet is 65° or below.

The difference between the viewing angle at a half brightness and a brightness curve inversion angle of the prism lens sheet is 20° or above.

According to a second aspect of the present invention, there is provided a backlight system comprising a transparent light guide plate, a linear light source disposed contiguously with at least one side end surface of the light guide plate, a reflecting plate disposed on a back side of the light guide plate, and the foregoing prism lens sheet.

According to a third aspect of the present invention, there is provided a liquid crystal display comprising a transmission liquid crystal display device, and the foregoing backlight system disposed on a back side of the transmission liquid crystal display device.

The above and other objects, features and advantages of the present invention will become more apparent from the following description taken in connection with the accompanying drawings.

DETAILED DESCRIPTION OF THE PREFERRED EMBODIMENTS

Figure 1:
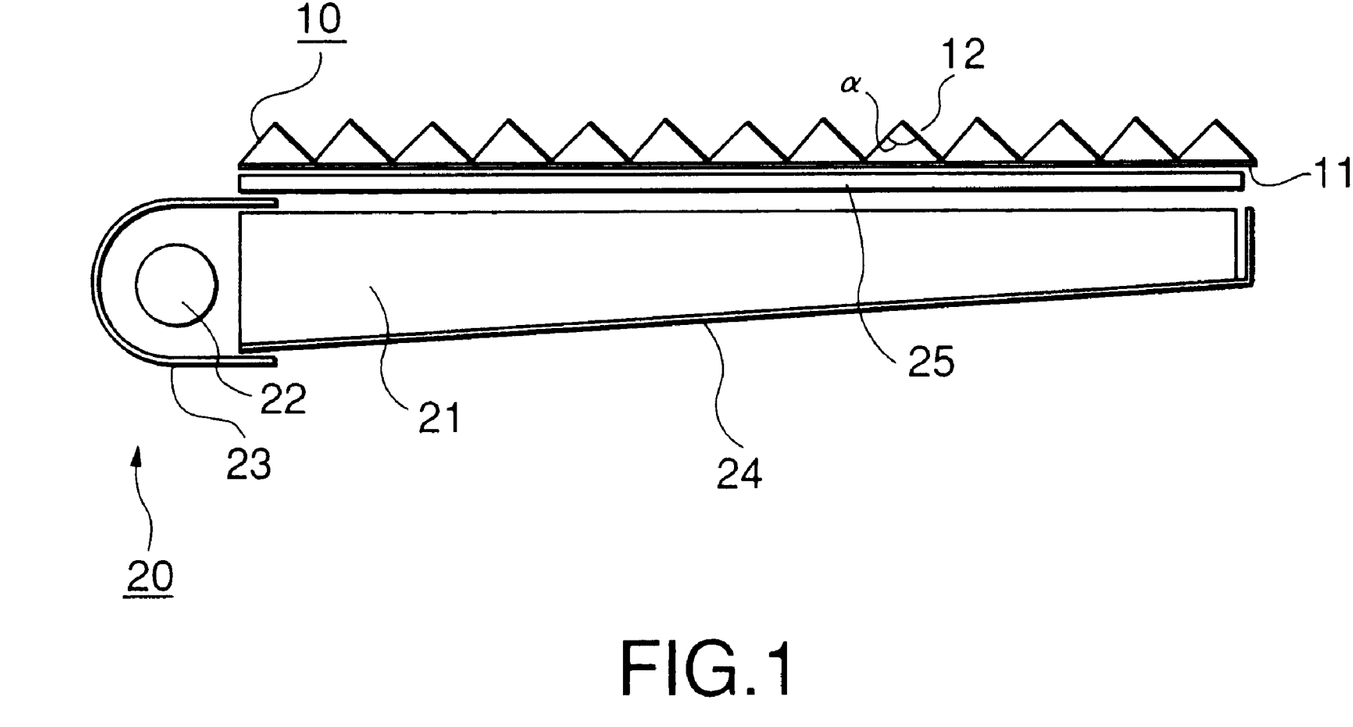
FIG. 1 is a side view of a backlight system employing a prism lens sheet of a preferred embodiment according to the present invention.

FIG. 1 shows a backlight system 20 employing a prism lens sheet 10 according to a preferred embodiment of the present invention. The prism lens sheet 10 has a transparent base sheet 11, and a lens sheet provided with a plurality of parallel unit lenses 12 having the shape of a triangular prism, arranged longitudinally and formed integrally with the base sheet 11.

The transparent base sheet 11 is a flat sheet or film of a thickness in the range of about 20 to 1000 μm of a polymer of acrylic acid ester or methacrylic acid ester, a copolymer of acrylic acid ester and methacrylic acid ester, such as polymethyl methacrylate or polymethylacrylate, a polyester resin, such as polyethylene terephthalate or polybutylene terephthalate, a transparent resin, such as a polycarbonate resin or a polystyrene resin, or a transparent material, such as transparent glass or a transparent ceramic material.

Each unit lens 12 has a cross section of an isosceles triangle having an apex angle a in the range of 80° to 87°. The unit lenses 12 are arranged at pitches preferably in the range of 10 to 500 μm. The unit lenses 12 are formed integrally with the transparent base sheet 11 by applying an ultraviolet-setting resin layer to the inner surface of a molding die having a cavity of a shape complementary to that of the prism lens sheet 10, placing the transparent base sheet 11 on the layer of the ultraviolet-setting resin, and irradiating the layer with ultraviolet rays to harden the layer of the ultraviolet-setting resin. The unit lenses may be formed by a method disclosed in JP-A No. 61-156273 which forms unit lenses by embossing a ultraviolet-setting thermoplastic resin film with an embossing roller, and irradiates the embossed ultraviolet-setting thermoplastic resin with ultraviolet rays. An ultraviolet-setting resin having a refractive index R in the range of 1.57 to 1.59 is preferable. The unit lenses 12 may be made of a resin other than the ultraviolet-setting resin. For example, the unit lenses 12 may be made of an ionizing radiation setting resin, such as an electron beam setting resin.

The backlight system 20 has a light guide plate 21 tapering from a maximum thickness at its proximal end to a minimum thickness at its distal end, a light source 22, such as a cold cathode fluorescent tube, a reflector 23 covering the light source 22 so as to reflect light emitted by the light source 22 toward the light guide plate 21, a reflecting plate 24 placed on the lower surface (as viewed in FIG. 1) of the light guide plate 21 to reflect light rays falling thereon, a diffuser plate 25 disposed over the light guide plate 21 to diffuse light rays outgoing from the light guide plate 21, and the prism lens sheet 10 embodying the present invention.

Figure 2:
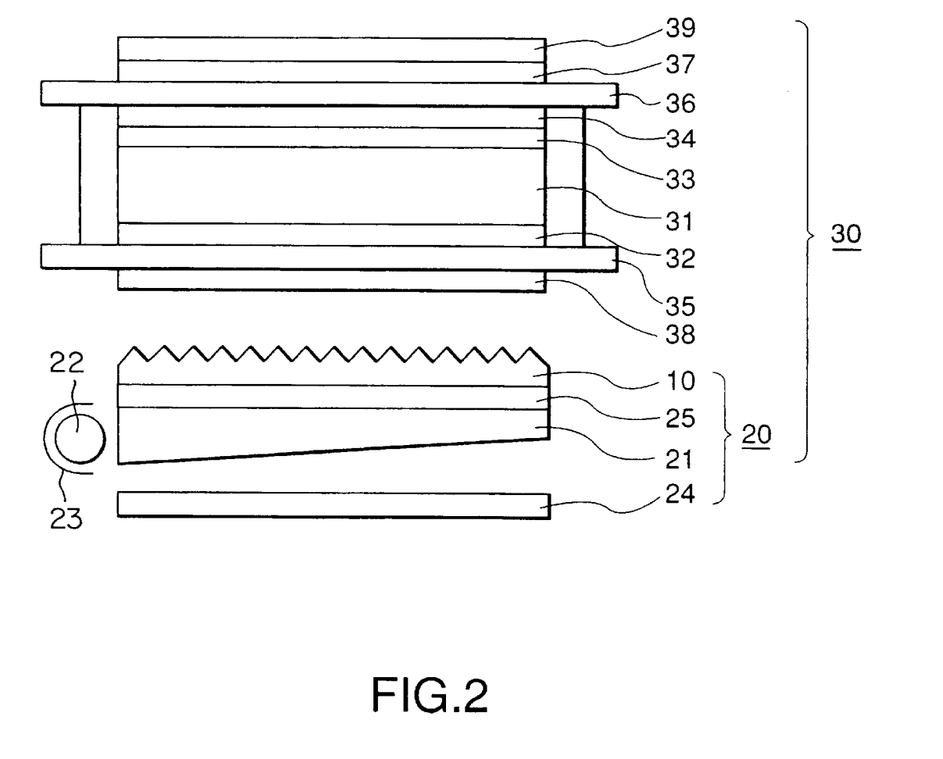
FIG. 2 is a side view of a liquid crystal display employing the backlight system of FIG. 1.

Referring to FIG. 2, a liquid crystal display 30 comprises the backlight system 20 of FIG. 1, a liquid crystal unit 31 having a matrix of cells, a transparent conductive film 32 and 33 disposed on the opposite surfaces of the liquid crystal unit 31, and having wiring lines for applying a voltage to the cells, respectively, a color filter 34 having predetermined patterns for red (R), green (G) and blue (B), sealing glass plates 35 and 36 sealing the assembly of the liquid crystal unit 31, the transparent conductive films 32 and 33, and the color filter 34 therebetween, a phase film 37 attached to the outer surface of the glass plate 36, and polarizing films 38 and 38 disposed on the light receiving side and the light emitting side, respectively, of the assembly of the liquid crystal unit 31, the transparent conductive films 32 and 33, the color filter 34, the glass plate 35 and 36 and the phase film 37.

Backlight systems in Examples 1 to 12 and Comparative Examples 1 and 2 were fabricated and the characteristics of those examples were examined through experiments.

In the backlight systems in Examples 1 to 12 and Comparative Examples 1 and 2, an acrylic plate of 11.3 in. in size having a base end of 2.5 mm in thickness and a distal end of 1.0 mm in thickness was employed as the light guide plates 21, a cold cathode fluorescent tube of 1.8 mm in diameter and 7.92 W in output capacity was employed as the light source 22, and a 125 $\mu$m thick PET film having a diffusing layer of organic beads (acrylic beads)(No. 7900 sc available from Dai Nippon Printing Co., Ltd. Japan) was employed as the diffuser plate 25.

Prism lens sheets 10 in Examples 1 to 12 and Comparative Examples 1 and 2 were fabricated by injecting ultraviolet setting resins having refractive indices R of 1.49, 1.57 and 1.59 into molding dies having cavities of shapes complementary to prism lens sheets provided with unit lenses having cross sections of shapes resembling isosceles triangles having apex angles of 80°, 83°, 85° and 90° to form lens sheets, respectively, combining the lens sheets and transparent base sheets, respectively, and irradiating the lens sheets through the base sheets with ultraviolet rays emitted by an ultraviolet light source for polymerization to form the prism lens sheets, and taking out the prism lens sheets from the molding dies.

Each prism lens sheet was combined with a diffuser plate 25 and placed over a light guide plate 21 provided with a light source 23 to form a backlight system, and the brightnesses of prism lens sheets were measured by a luminance meter (BM-7, pupil angle: 0.2°, Topcon Corporation, Japan) disposed in front of the prism lens sheets at a distance of 500 mm from the front surfaces of the prism lens sheets. Measured results are shown in FIGS. 3(A) to 3(D), 4(A) to 4(D) and 5(A) to 5(D), which show relations between the viewing angle and the brightness. FIGS. 6(A) is a graph showing measured brightness of the backlight system in Comparative Example 1, when the prism lens sheet is removed, and FIG. 6(B) is a graph showing measured brightness of the backlight system in Comparative Example 2 provided with the prism lens sheet with unit lenses made of an ultraviolet setting resin having a refractive index R of 1.57, and having the shape of an isosceles triangle having an apex angle α of 97°.

The liquid crystal display according to the present invention is intended for use on a lap top personal computer provided with a screen of about 10 in. in size. While the operator is observing the screen at a position that is at a distance of 400 mm from the center of the surface of the screen, it is generally difficult to observe the screen from a sidewise position that is at a lateral distance of 250 mm from the operator's observing position. From this fact, it can be said that a unilateral viewing angle that makes a person beside the operator difficult to observe the screen is greater than about 32°.

Figure 3A:
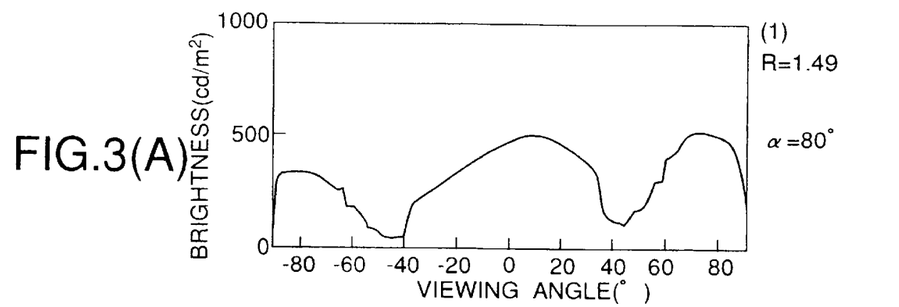
FIGS. 3(A), 3(B), 3(C) and 3(D) are graphs showing variations of measured brightness of the backlight system shown in FIG. 1 with viewing angle.
Figure 3B:
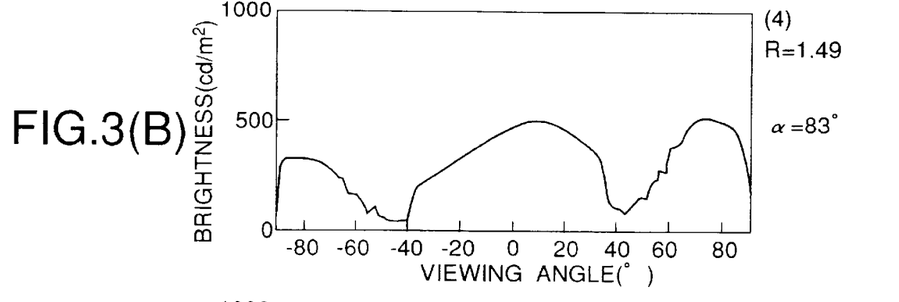
Figure 3C:
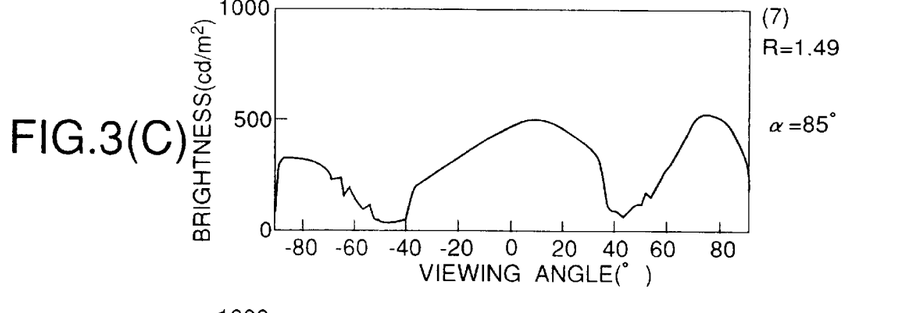
Figure 3D:
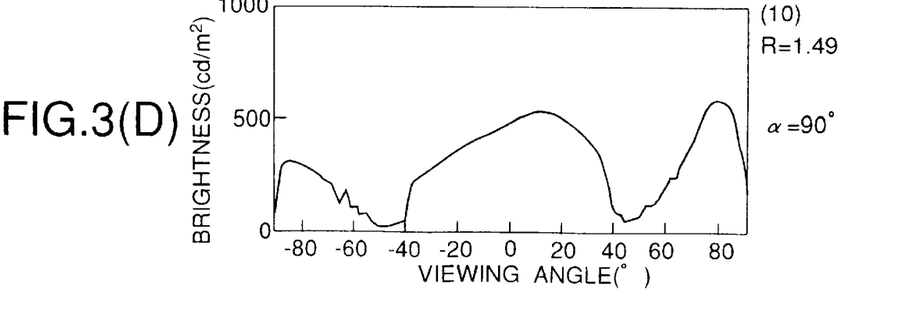
Figure 4A:
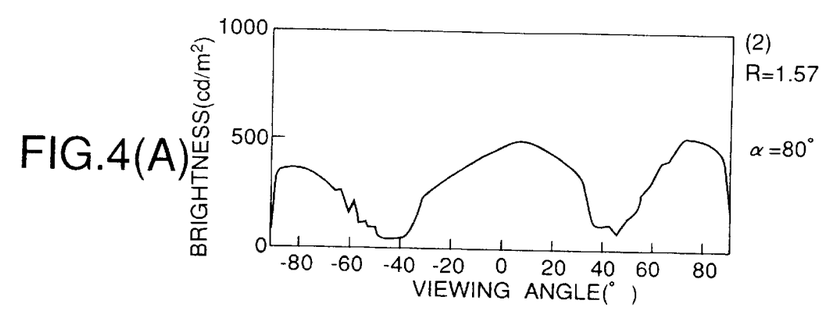
FIGS. 4(A), 4(B), 4(C) and 4(D) are graphs showing variations of measured brightness of the backlight system shown in FIG. 1 with viewing angle.
Figure 4B:
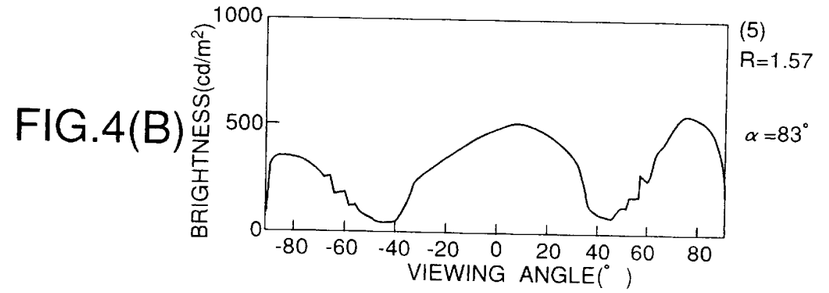
Figure 4C:
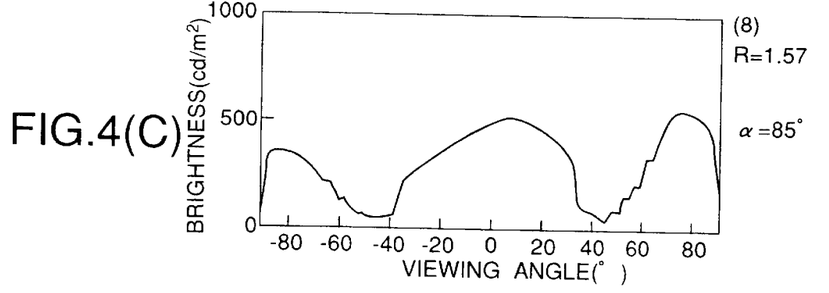
Figure 4D:
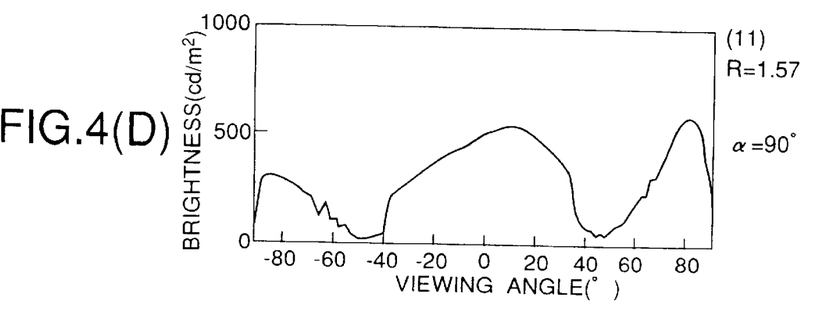
Figure 5A:
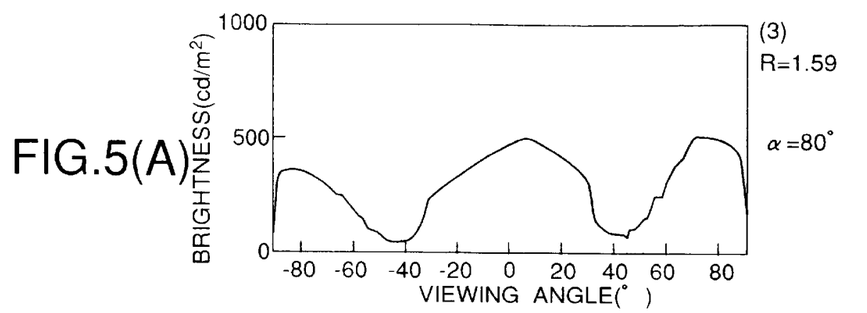
FIGS. 5(A), 5(B), 5(C) and 5(D) are graphs showing variations of measured brightness of the backlight system shown in FIG. 1 with viewing angle.
Figure 5B:
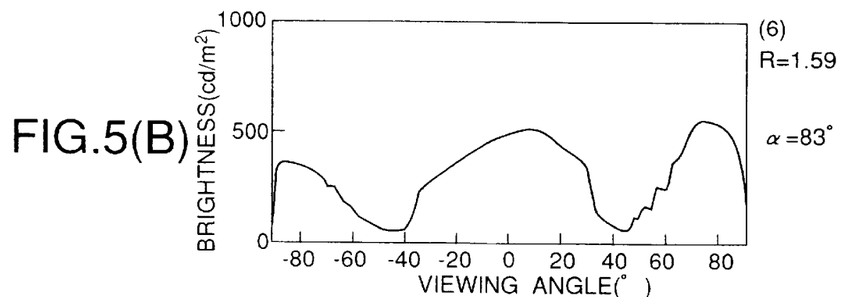
Figure 5C:
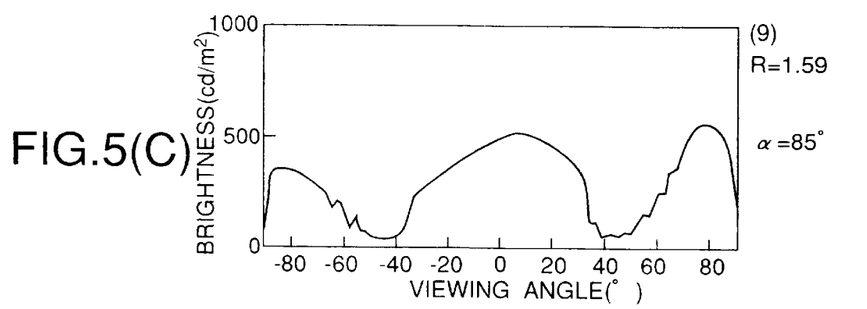
Figure 5D:
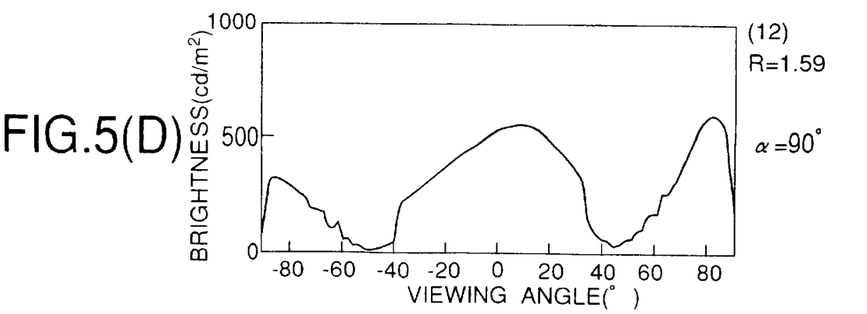
Figure 6A:
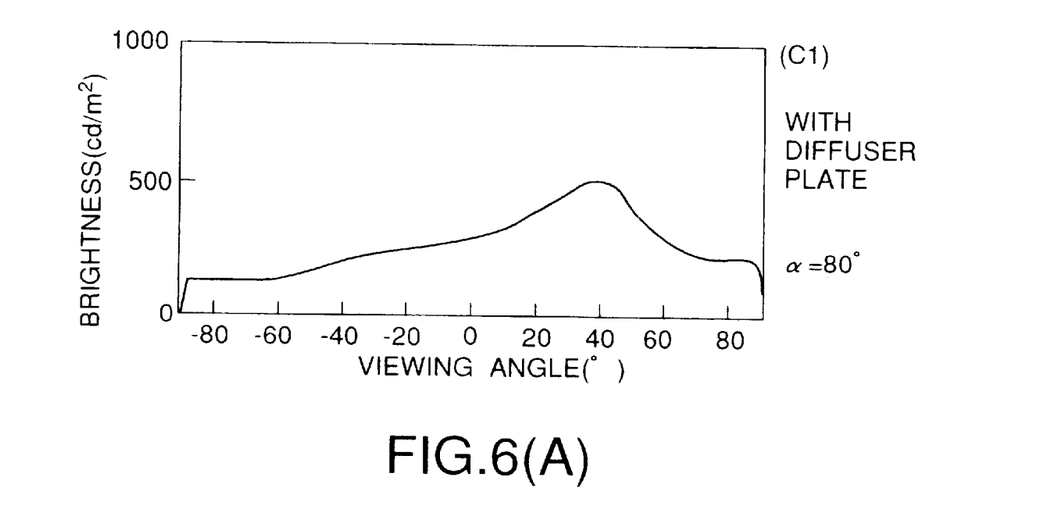
FIGS. 6(A) and 6(B) are graphs showing variations with viewing angle, of measured brightness of backlight system in Comparative Examples.
Figure 6B:
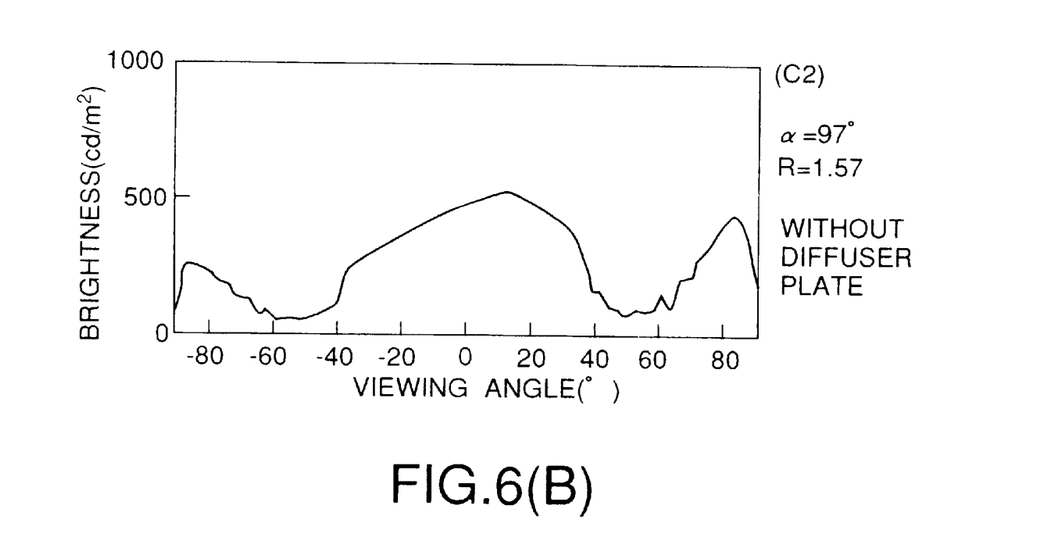

|  | α° | R | Measured results |
|---|---|---|---|
| Example 1 | 80 | 1.49 | FIG. 3(A) |
| Example 2 | 80 | 1.57 | FIG. 4(A) |
| Example 3 | 80 | 1.59 | FIG. 5(A) |
| Example 4 | 83 | 1.49 | FIG. 3(B) |
| Example 5 | 83 | 1.57 | FIG. 4(B) |
| Example 6 | 83 | 1.59 | FIG. 5(B) |
| Example 7 | 85 | 1.49 | FIG. 3(C) |
| Example 8 | 85 | 1.57 | FIG. 4(C) |
| Example 9 | 85 | 1.59 | FIG. 5(c) |
| Example 10 | 90 | 1.49 | FIG. 3(D) |
| Example 11 | 90 | 1.57 | FIG. 4(D) |
| Example 12 | 90 | 1.59 | FIG. 5(D) |
| Comp. Example 1 | — | — | FIG. 6(A) |
| Comp. Example 2 | 97 | 1.57 | FIG. 6(B) |

Figure 7:
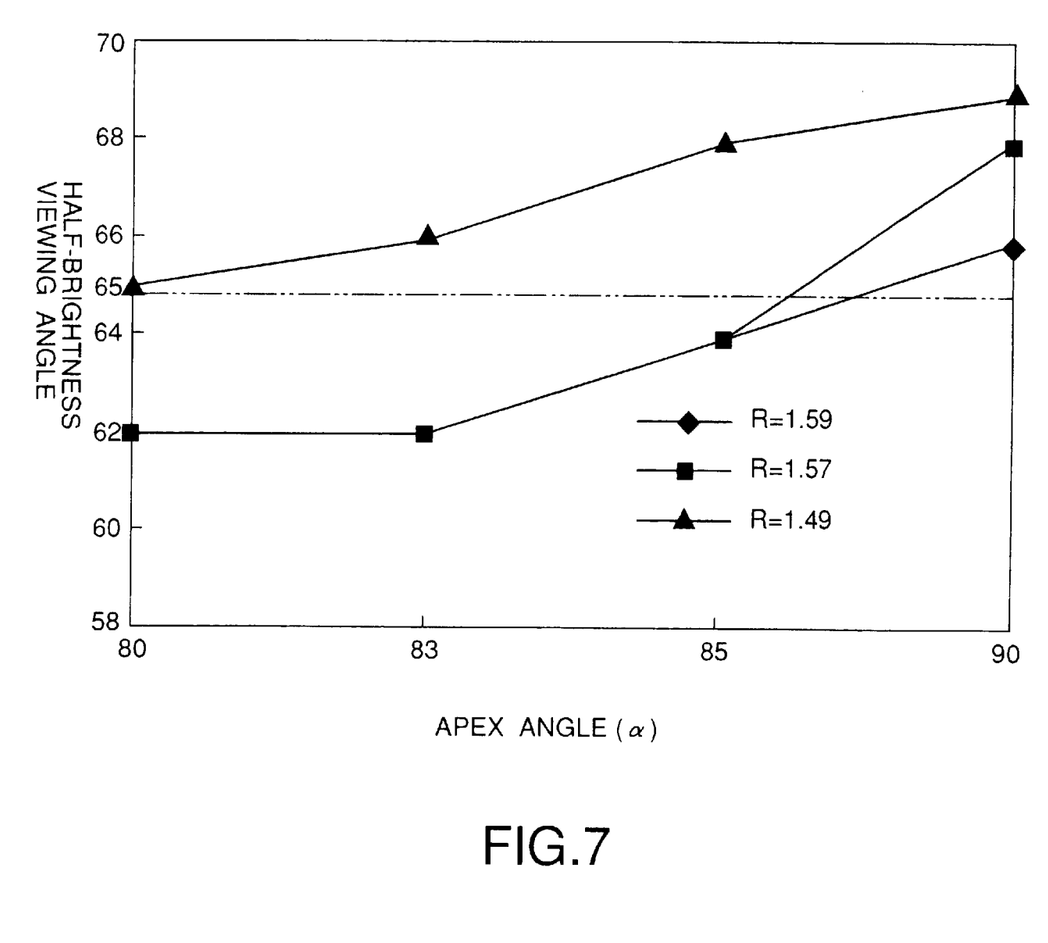
FIGS. 7 is a graph showing variations of viewing angle at a half brightness, with apex angle determined on the basis of the graphs shown in FIGS. 3(A) to 3(D), 4(A) to 4(D) and 5(A) to 5(D)
Figure 8:
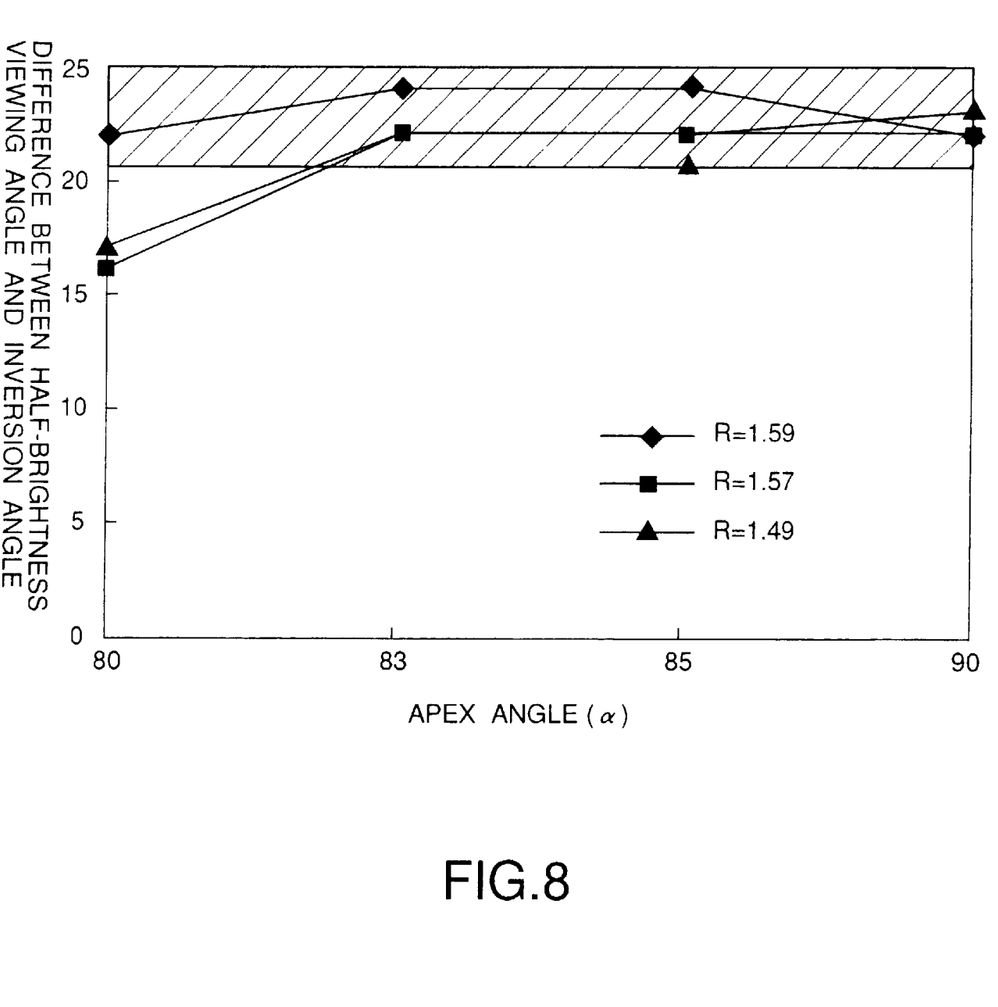
FIG. 8 is a graph showing variations of the difference between viewing angle at a half brightness and inversion angle, with apex angle determined on the basis of the graphs shown in FIGS. 3(A) to 3(D), 4(A) to 4(D) and 5(A) to 5(D)
Figure 9:
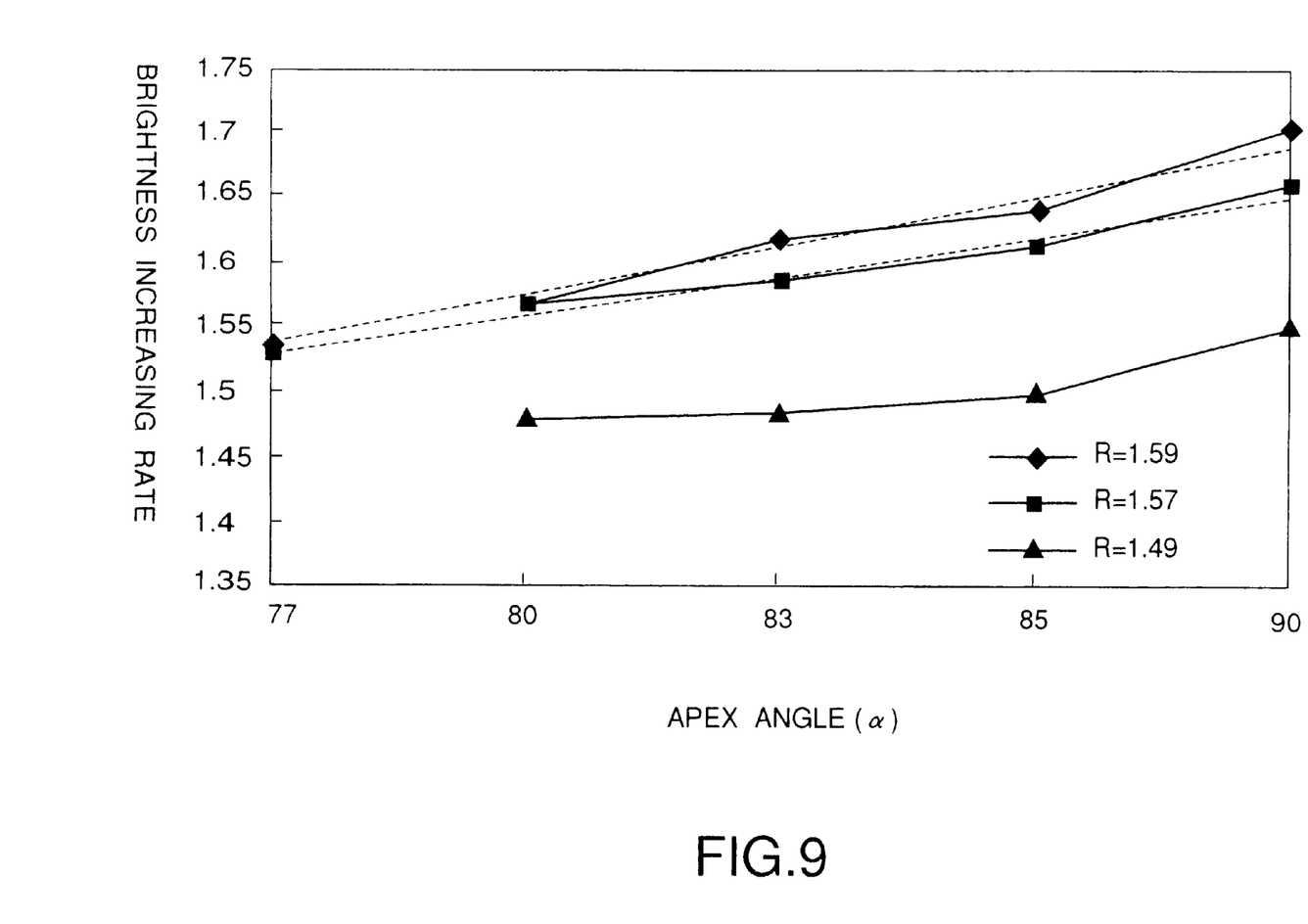
FIG. 9 is a graph showing variations of brightness increase ratio with apex angle determined on the basis of the graphs shown in FIGS. 3(A) to 3(D), 4(A) to 4(D) and 5(A) to 5(D)

FIG. 7 to FIG. 9 are graphs showing variations of viewing angle at a half brightness with apex angle, variations of the difference between the viewing angle at a half brightness and an inversion angle with apex angle, and variations of brightness increase ratio with apex angle, which were determined on the basis of the graphs shown in FIGS. 3(A) to 3(D), 4(A) to 4(D) and 5(A) to 5(D).

Viewing angle at a half brightness is a viewing angle relative to the surface of the prism lens sheet at which the brightness is half the maximum brightness at zero viewing angle. This angle will be referred to hereinafter as "half-brightness viewing angle". The screen can satisfactorily be observed when viewed in a direction of a viewing angle less than the half-brightness viewing angle, and cannot satisfactorily be observed when viewed in a direction of a viewing angle exceeding the half-brightness viewing angle. It will be understood from FIG. 7 that combinations of the apex angle α and the refractive index R giving a half-brightness viewing angle less than 65° are desirable. A half-brightness viewing angle of 65° means that a unilateral viewing angle relative to a normal is approximately 32°.

Inversion angle is an angle at which the brightness distribution curve, as shown in FIG. 3(A) to FIG. 5(D), makes an inversion from decrease to increase as the viewing angle increases. In the graph of FIG. 4(A), for example, the inversion angle is about 40°. If the screen is observed in a direction of a viewing angle exceeding the inversion angle, the screen looks dark and pictures displayed on the screen are invisible. The greater the difference between the half-brightness viewing angle and the inversion angle, the wider is the range of direction in which the screen is invisible. A proper difference between the half-brightness viewing angle and the inversion angle is necessary to keep information confidential.

Brightness increasing rate is a rate of increase in the brightness at the front of the backlight system 20 before and after the prism lens sheet 10 is attached to a backlight system or a liquid crystal display, i.e., the rate of the difference between the frontal brightness of the backlight system 20 or the liquid crystal display 30 with the prism lens sheet 10 and that of the backlight system 20 without the prism lens sheet 10. In view of securing satisfactory contrast and visibility, a greater brightness increasing rate is more desirable. As is obvious from FIG. 9, brightness increasing rate increases with the increase of the apex angle α toward 90°, and a greater refractive index R gives a greater brightness increasing rate.

Figure 10:
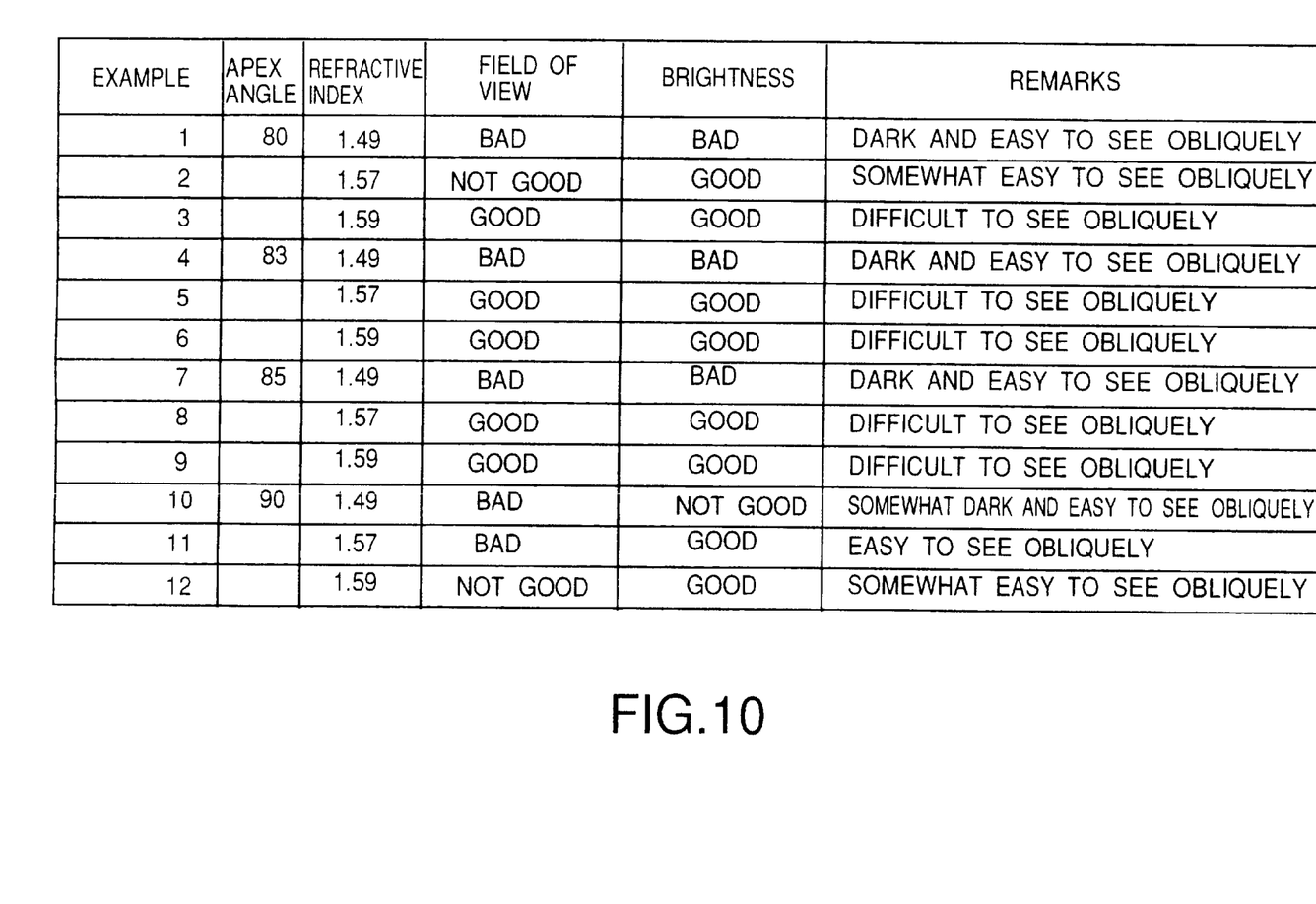
FIG. 10 is a table showing the results of evaluation of the field of view and the brightness of a backlight system employing the prism lens sheet shown in FIG. 1.

FIG. 10 is a table showing the results of visual evaluation of the field of view and the brightness of the backlight systems in Examples 1 to 12 and Comparative Examples 1 and 2. As is knowin from FIG. 10, the backlight systems provided with the prism lens sheet 10 of a material having a refractive index R of 1.49 are rather dark. Pictures displayed on the screens of liquid crystal displays employing the backlight systems provided with the prism lens sheet having unit lenses having an apex angle α of 90° are rather easily visible from oblique directions. The brightness increasing rate is excessively low even if the prism lens sheet is made of a material having a refractive index R of 1.57 or 1.59 when the apex angle a is 80° or below. Therefore, the apex angle α must be greater than 80°.

In consideration of the position of observation by persons other than the operator, the half-brightness viewing angle, and the difference between the half-brightness viewing angle and the inversion angle, a desirable apex angle α should in the range of 80° to 87°, and a desirable refractive index R should be in the range of 1.57 to 1.59.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A prism lens sheet for use in a backlight system, said prism lens sheet including:

a transparent base sheet; and a lens sheet integrally attached to a surface of the base sheet and provided with parallel unit prism lenses, each having a cross section in the shape of an isosceles triangle with an apex angle of 80 to 85°, said unit lenses being made of a radiation setting resin and having a refractive index in the range of 1.57 to 1.59.

2. A backlight system comprising:

a light guide plate of a light conducting material;

a light source provided along at least one side edge of the light guide plate;

a light reflecting plate provided on a back side of said light guide plate; and a prism lens sheet provided on a front side of said light guide plate, opposite said back side;

wherein said backlight system has (1) a viewing angle at a half brightness of from 62 to 65° and (2) a difference between the viewing angle at a half brightness and a brightness curve inversion angle of from 20 to 25°.

3. The backlight system according to claim 2, wherein said prism lens sheet comprises:

a transparent base sheet; and a lens sheet integrally attached to a front surface of the base transparent sheet and provided with parallel unit lenses, each of the unit lenses having a shape of an isosceles triangle.

4. The backlight system according to claim 3, wherein said isosceles triangle has an apex angle ranging from 80 to 85°.

5. The backlight system according to claim 3, wherein said unit lenses are made of a material having a refractive index in a range of 1.57 to 1.59.

6. The backlight system according to claim 3, wherein said unit lenses are made of a radiation setting resin.

* * * * *